United States Patent
Thiebaut et al.

(10) Patent No.: US 9,503,553 B2
(45) Date of Patent: Nov. 22, 2016

(54) DEVICE FOR CONTROLLING THE IMPLEMENTATION OF FUNCTIONS IN A SERVICE DEVICE BELONGING TO AN INTERNET COMMUNICATION NETWORK CORE

(75) Inventors: Laurent Thiebaut, Antony (FR); Guylaine Queau, Verrieres-le-Buisson (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1028 days.

(21) Appl. No.: 12/063,952

(22) PCT Filed: Aug. 11, 2006

(86) PCT No.: PCT/FR2006/050799
§ 371 (c)(1),
(2), (4) Date: Feb. 15, 2008

(87) PCT Pub. No.: WO2007/020360
PCT Pub. Date: Feb. 22, 2007

(65) Prior Publication Data
US 2008/0219257 A1 Sep. 11, 2008

(30) Foreign Application Priority Data
Aug. 17, 2005 (FR) ...................................... 05 52519

(51) Int. Cl.
*H04L 29/08* (2006.01)

(52) U.S. Cl.
CPC ............. *H04L 69/329* (2013.01); *H04L 67/16* (2013.01)

(58) Field of Classification Search
CPC .................. H04L 69/329; H04L 67/16; H04M 3/42093; H04M 3/42102; H04M
(Continued)

(56) References Cited

U.S. PATENT DOCUMENTS 7,184,421 B1 * 2/2007 Liu et al. ...................... 370/338
7,702,804 B2 4/2010 Morinaga et al.
(Continued)

FOREIGN PATENT DOCUMENTS

JP 6-164768 A 6/1994
JP 2004-234259 A 8/2004
(Continued)

*Primary Examiner* — Yee Lam
(74) *Attorney, Agent, or Firm* — Harness, Dickey & Pierce, P.L.C.

(57) ABSTRACT

An device (A) is dedicated to controlling the implementation of functions linked with providing at least one communication service to at least one communication terminal (T1) in a service equipment (SA1) belonging to an Internet communication core network (NC). The device (A) comprises control means (CM) which, upon receipt of a request for providing the service offered by its equipment (SA1) for a given communication, are tasked with (i) deciding to implement at least one function selected from among the functions offered by the equipment (SA1); and, subsequently, (ii) inserting data signaling that decision into at least one of the signaling messages sent by the equipment for the communication in question, which are intended for at least some other service equipments (PS1, PS2, SA2, MR1) of the core network (CR), so that they can prohibit themselves from implementing the selected function for the duration of the given communication.

13 Claims, 1 Drawing Sheet

(58) Field of Classification Search
CPC ............ 3/42365;H04M 2242/14; H04M 3/02; H04M 3/42017; H04M 15/39; H04M 15/00; H04M 3/487; H04W 4/02
USPC ........................................................ 370/389
See application file for complete search history.

(56) References Cited

U.S. PATENT DOCUMENTS

| | | | |
|---|---|---|---|
| 2002/0026473 A1* | 2/2002 | Gourraud ...................... | 709/203 |
| 2002/0187771 A1* | 12/2002 | Eto et al. ...................... | 455/406 |
| 2003/0096592 A1* | 5/2003 | Moreau et al. ............... | 455/406 |
| 2004/0076143 A1* | 4/2004 | Lee ................................ | 370/352 |
| 2004/0122903 A1* | 6/2004 | Saulpaugh et al. ........... | 709/206 |
| 2004/0158645 A1 | 8/2004 | Morinaga et al. | |
| 2005/0094796 A1* | 5/2005 | Beauford .................. | 379/211.01 |
| 2005/0125692 A1* | 6/2005 | Cox et al. ..................... | 713/201 |
| 2005/0198282 A1* | 9/2005 | Stahl et al. ................... | 709/225 |
| 2005/0213606 A1* | 9/2005 | Huang et al. ................. | 370/467 |
| 2005/0259679 A1* | 11/2005 | Chowdhury et al. ......... | 370/465 |
| 2006/0189319 A1* | 8/2006 | Houldsworth et al. ....... | 455/445 |

FOREIGN PATENT DOCUMENTS

| | | |
|---|---|---|
| WO | WO 99/28805 A2 | 6/1999 |
| WO | WO 2004/105412 A1 | 12/2004 |

* cited by examiner

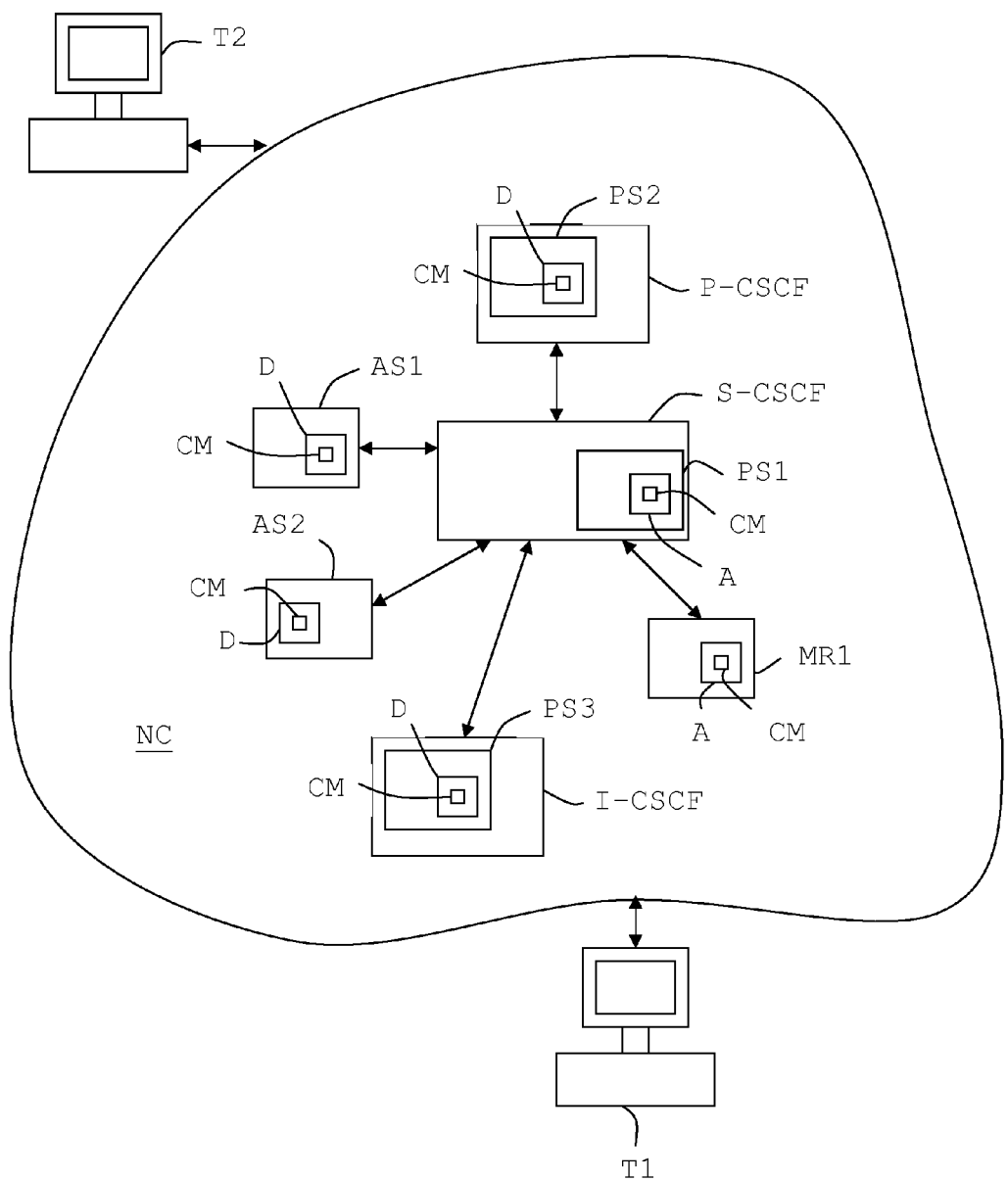

DEVICE FOR CONTROLLING THE IMPLEMENTATION OF FUNCTIONS IN A SERVICE DEVICE BELONGING TO AN INTERNET COMMUNICATION NETWORK CORE

BACKGROUND

1. Field

The invention concerns communication networks with an IP type core network (IP standing for "Internet Protocol"), and more particularly, access by communication terminals to services that such networks make available to their users.

2. Related Art

Here, "communication network with an IP type core network" is meant to refer to both end-to-end IP networks, in which the user has an IP link, and to networks with an IP-type core network, which can be accessed by another technology via a gateway. Such networks are, for example, those which rely on the technology SIP (for "Session Initiation Protocol"), such as IMS networks (for "IP Multimedia Subsystem" (3GPP)), or MMD (for "Multimedia Domain" (3GPP2)).

Additionally, the term "communication terminal" here refers to any communication device, using radio waves or wired, fixed or mobile (or portable) which can connect to at least one IP network, possibly using a gateway or gateways, in order to exchange data with another device in the form of signals. It may, therefore, be a land-line or mobile telephone, or a desktop or laptop computer, or a personal digital assistant (or PDA) equipped with a communication module, or a server equipped with a communication module that may possibly belong to a provider that delivers the service and that contains a User Agent function.

As is known to a person skilled in the art, certain Internet core networks include service equipments, such as "proxy" servers (or "SIP-proxy") intended mainly for "smart" routing of SIP signalling, application servers, and MRF (or "Media Resources Function") entities tasked with providing (calling or called) terminals with communications-related services. Among these services, one may mention in particular prepayment, or CMM services (for "Corporate Mobility Manager"—virtual office), messaging, conferences, portals, kiosks, downloading ringtones, or "push to talk."

More precisely, when a terminal needs to access a service, either upon initiation by its user or by a core network, it must send an access request for said service to the network on which it is a client. Once this request is received, the network routes it using an SIP proxy server for example to the (or one of the) application server(s) dedicated (at least) to that service, i.e. tasked with managing and controlling the furnishing of the requested service to the calling terminal.

Here, the term "service" is meant to refer to any service that relates, at least in part, to communication whose purpose is to exchange media data streams in any form, such as voice streams (VoIP for "Voice over IP"), video streams or text streams (for instance "chatting"). It is important to note that the streams may be interactive, whether in real-time or not.

Providing these service frequently requires the implementation, by one of the service equipments involved in a communication service, of a complementary function, such as (and not limited to) charging. Now, in a same core network, several service equipments are generally capable of implementing the same complementary function. This is particularly true of the so-called "on-line" charging, used for contacting a server that manages, in real time, the credits that users have. For this reason, in a core network, the SIP proxies and certain application(s) servers are capable of implementing the function of on-line charging.

The disadvantage resides in the fact that neither an SIP proxy nor an application(s) server can know if it must implement its own complementary function, or if another service equipment must do it. Currently, the SIP proxy, which is in charge of communication, always implements its complementary on-line charging function. Frequently, it happens that the application(s) server, which it invoked in order to provide a called service, implements its own complementary on-line charging function in parallel. This may lead to interference. Additionally, this doubles the interactions (signaling exchanges) with the server that manages the on-line charging, and therefore doubles the computing (or CPU) resources used, all while introducing delays in establishing the session.

There are, of course, proprietary solutions that consist of providing service equipments, such as SIP proxies, with local tables that specify which application(s) servers are suitable for implementing complementary functions. However, every time a new service is offered by a core network (and therefore when a new application(s) server is added to that core network), or whenever a new version of an application(s) server is added to that core network, it is necessary to update each SIP proxy's local tables, which requires coordinating maintenance operations (or OAM). Additionally, if an application(s) server, tasked with implementing a complementary function, withdraws from a session, the SIP proxy cannot act as a substitute for it for the purpose of implementing that complementary function.

SUMMARY

As no known solution is fully satisfactory, the goal of the invention is therefore to improve the situation.

To that effect, it proposes a control device for a service equipment intended to implement, within an Internet communication core network, functions related to providing at least one communication service to at least one (calling or called) communication terminal.

This control device is characterized in that it comprises control means configured so as to, when a request to provide a service (offered by the equipment) for a given communication (of a session between called and calling terminals) is received, decide (or refuse) to implement at least one function chosen from among the functions handled by the equipment, then to insert in the signaling (i.e. in at least one of the signaling messages) sent by the equipment for this communication (or session) information data signaling this decision (for implementing each function chosen by the equipment) to at least some of other service equipments in the core network, in order to prohibit them from implementing the chosen function for the duration of the given communication.

The device of the invention may include other characteristics, which may be taken separately or in combination, particularly:

- the other service equipments in the core network which interpret these information data signaling this decision (for implementing each function chosen by the device) are preferably part of the same parent network (that to which the calling terminal belongs or that to which the called terminal belongs);
- its control means may be tasked, when incorporated into a service equipment located on a communication network border, with deleting decision information data contained within a signaling message coming from outside the network;

its control means may be tasked, when incorporated into a service equipment (such as an "application server") operating in so-called "back to back user agent" mode—and therefore including "first" and "second" user agents adapted for managing and coordinating multiple SIP dialogues that correspond to the same communication—and when the "first" user agent receives a signaling message containing decision information data, to order the "second" user agent(s) to report (or transfer) this decision information data in the SIP signaling that it (or they) generate(s) (so-called "back-to-back" operating mode);

its control means may be tasked with integrating the information data into a dedicated header in the signaling message, or into a field of a signaling message header, such as for example a so-called record-route field, when the communication-establishing protocol is the signaling messages transmission management protocol called SIP;

its control means may be tasked with integrating complementary information data into some of at least said signaling messages containing said decision information data. For example, this complementary information data is representative of an identifier for a service equipment in which the device is implemented and/or of the type of service implemented (such as billing for the service, excluding or not excluding billing for the session).

The invention also discloses a service equipment for an Internet communication core network, intended to implement functions related to providing at least one communication service to at least one communication terminal, and including a control device of the type of the one disclosed above.

Such a service equipment may, for example, constitute an entity with an SIP type communication-establishing protocol, chosen from among a server with a "proxy" function (or "SIP-proxy"), an application(s) server, and an MRF type (or "Media Resources Function") entity.

The invention is particularly suitable, though not exclusively so, for Internet communication core networks such as IMS (for "IP Multimedia Subsystem") and MMD (for "Multimedia Domain").

BRIEF DESCRIPTION OF THE DRAWINGS

Other characteristics and advantages of the invention will become apparent upon examining the detailed description below, and the attached drawing, in which the sole FIGURE very schematically depicts an IP core network to which SIP proxies, application(s) servers, and MRF entities equipped with the control device of the invention are connected. The attached drawing may not only serve to complete the invention, but also to contribute to defining it, if need be.

DETAILED DESCRIPTION

The purpose of the invention is to enable a service equipment that is installed in an Internet core network and capable of implementing at least one function related to providing at least one communication service to at least one (called or calling) communication terminal, to notify other service equipments that it is itself tasked with implementing this function for the duration of a given communication.

The following assumes, for the purposes of a non-limiting example, that the Internet (or IP) communication core network is of IMS or MMD type, or a derivative thereof (such as with networks defined by the TISPAN group of ETSI). However, the invention is not limited to this type of core network. It actually concerns all Internet core networks that belong to, or are coupled to, an IP communication network, such as a PSTN or PLMN network.

As is very schematically depicted in the sole FIGURE, a core network NC may include at least one server with a "proxy" function (or "SIP-proxy") PSi, at least one application(s) server ASj, and/or at least one MRF (or "Media Resources Function") entity MRk, tasked with providing (calling or called) terminal(s) Tn with services related to communications.

In the depicted non-limiting example, firstly, the variable i is equal to 1 or 2, but it may be given any non-zero value; secondly, the variable j is equal to 1 or 2, but it may be given any non-zero value; thirdly, the variable k is equal to 1, but it may be given any non-zero value; and fourthly, the variable n is equal to 1 or 2, but it may be given any non-zero value.

It is assumed in the following that the communication terminals Tn are desktop or laptop computers. However, the invention is not limited to communications services involving called and calling terminals of this type. It concerns communication services involving any communication device, using radio waves or wired, fixed or mobile (or portable) which can connect to at least one IP network, possibly using a gateway or gateways, in order to exchange data with another device in the form of signals. It may, therefore, be a land-line or mobile telephone, or a desktop or laptop computer, or a personal digital assistant (or PDA) equipped with a communication module, or a server equipped with a communication module that may possibly belong to the provider that delivers the service, with the server containing a User Agent function.

The invention proposes to equip at least some of the service equipments PSi, ASj and MRk, and preferably all of them (as depicted), with a control device A or D comprising a control module MC tasked, when its equipment receives a request from a calling or called terminal Tn to provide a communication service in which it intervenes, to decide (or refuse) to implement at least one function chosen from among the functions that are handled by its equipment, then to insert in the signalling (i.e. in at least some of the signaling messages) that they are sending for a given communication (or session) information data signaling that decision, intended to at least some of other service equipments in the core network NC, so that they can prohibit themselves from implementing the chosen function for the duration of the given communication.

In what follows, it is assumed, for the purpose of a non-limiting example, that the function for which a decision is being made is an on-line charging control function. However, the invention is not limited to this application. A service equipment is then said to be suitable for implementing the on-line charging control function when it has the internal capabilities that enable it, firstly, to contact an on-line charging server, secondly, to notify the end user that his credit will soon be depleted or is depleted and that as a result the communication service will soon or immediately be halted or suspended, and thirdly, to end the communication service when the on-line credit becomes zero or, contrariwise, to resume a communication service once the user has recredited his account with the on-line charging server.

Additionally, it is assumed in the following that the signaling messages comply with an SIP (for "Session Initiation Protocol") type communication-establishing protocol, which is used to create and manage data exchange sessions (under any form), particularly in an interactive, real-time fashion, between service equipments, independent of the nature of the data and of the transport protocol used to transport said data.

In this case, the service access request, which is transmitted by a terminal Tn to an SIP proxy PSi, is in the form of an SIP establishment message of the "SIP INVITE" type. As a reminder, an INVITE message contains an "SDP" describing the various media that a calling terminal supports, and that subsequent to the receipt of that INVITE message, a negotiation takes place between the devices to determine the media that will be used during the session.

In the example depicted, the variable i is between 1 and 3 inclusive (PS1 to PS3), but it may be given any non-zero value.

In an IMS or MMD network, the SIP proxies PSi, which are not placed on the border of said network, are generally installed in a device called S-CSCF (for "Serving-Call Session Control Function").

Preferably, the application(s) server ASj is the entity invoked by an SIP proxy PSi, subsequent to the receipt of a service access request, which first decides to implement (or not implement) its on-line charging function. This is preferable as the application(s) server dedicated to the service is the one which knows and manages the media communication channels that enable communication with the end user's terminal and which is tasked with data exchange with that terminal, and not the SIP proxy PSi which invokes that application(s) server ASj and which is tasked with coordinating requests between the requesting terminal Tn and said application server.

The decision information data, which is placed in a signaling message by the control module CM subsequent to the decision to "handle" a function (here the on-line charging function), may appear in any form, and in particular in the form of a mark, or a sign, or a digit or word.

Additionally, the control module CM may, for example, integrate the decision information data into a new dedicated (and standardized) signaling message header, or into an existing field in a signaling message header. In the first case, adding a new header to a signaling message is instantaneous, as the SIP protocol is text-based. In the second case, the header field, into which the decision information data is integrated, may be the so-called "record-route" field.

Additionally, the decision information data may, for example, be integrated by the control module CM into the SIP signaling message, which initiates an SIP dialog, for example in the event of a call or an instant message.

It is important to note that the control module CM may be tasked with integrating complementary information data into at least some of the signaling messages that contain decision information data. Such complementary information data may, for example, be representative of the identifier, within the core network NC, for the service equipment in which it is installed, and/or of the type of service implemented (such as billing for the service, excluding or not excluding billing for the session).

Each signaling message containing decision information data is communicated by the SIP proxy PSi, which invoked the application(s) server ASj [or an MRF, or the SIP proxy itself] that generated it, to at least some other service equipments. Preferably, the SIP proxy PSi communicates this signaling message to all IMS service equipments (PSi', ASj', and MRk) that are installed in the core network NC of the parent network of either the calling terminal involved in the communication (or session) or the called terminal involved in that communication (or session), i.e. all the service equipments which are located on the calling side or called side of a session.

In this way, all service equipments are notified of the fact that an application server (or an MRF, or an SIP proxy) is being tasked with implementing the on-line charging function for a given communication (and for the part of the session concerned), and that therefore, in principle, they do not have to handle that task. The expression "in principle" is used here for very specific situations in which a service equipment must either take over for another service equipment to implement on-line charging, or to handle that implementation in parallel. When such a situation arises, service equipments are notified of it, such as via complementary information data specifying the type of online billing implemented, for example.

When the control device A or D is installed in an SIP proxy PSi located on a network border (either on the access side, or on the side of the network located at the network/user interface, as when the SIP proxy is installed in a P-CSCF (for "Proxy-Call Session Control Function") type or I-CSCF (for "Interrogating-Call Session Control Function") type equipment of an IMS or MMD network), its control module CM is preferably configured to delete the decision information data contained within signaling messages coming from outside their network (and therefore coming from a terminal or from another network).

This option is intended to eliminate frauds, and in particular to prevent "hackers" from trafficking in false information so as to benefit from a function (here, communication) without authorization (here, at no charge).

Additionally, certain application(s) servers can operate in so-called "Back to Back User Agent" mode. In such a case, as is known to a person skilled in the art, they include "first" and "second" user agents that can manage and coordinate multiple SIP dialogues corresponding to a single communication, with the first user agent being tasked with receiving signaling messages coming from a terminal, and the second user agent(s) being tasked with generating messages intended to other terminals, taking into account the signaling messages received by the first user agent. This configuration is known by the term "back to back user agent."

In this configuration, when the first user agent receives a signaling Message containing decision information data, the control module CM of the device A or D installed in the application(s) server is tasked with ordering the second user agent(s) to report (or transfer) this decision information data into the SIP signaling that it generates (or that they generate).

It should be noted that some complementary information data, such as the identifier of the equipment that decides to implement a service or part of a service (when said service is broken down into several types), and/or the identifier of the function (service) implemented by that equipment, may be stored by the equipments, which receive the signaling messages that contain said data. This storage may, for example, be done using what a person skilled in the art calls a toll ticket, which is implemented for at least some of the communications by some of the receiving devices.

The control device A of the invention, and in particular its control module CM, may be constructed in the form of electronic circuits, software (or computing) modules, or a combination of circuits and software.

The invention is not limited to the forms of embodiment of the control device and the service equipment described in the foregoing, which are given only as an example; rather, it encompasses all variants that a person skilled in the art may envision within the framework of the claims set forth below.

The invention claimed is:

1. A control device for a service equipment adapted for implementing, within an Internet communication core network, functions related to providing at least one communication service to at least one communication terminal, comprising:
   a control unit configured to decide, when a request to provide said at least one communication service for a given communication is received, to implement at least one function chosen from among said functions, then to insert in at least one of a plurality of signaling messages that said service equipment is sending for said given communication, decision information data signaling this decision intended for at least some other service equipments in said core network, in order to prohibit said at least some other service equipments from implementing the chosen function for the duration of the given communication wherein said chosen function is dedicated to on-line charging of at least one of a called terminal and a calling terminal.

2. The device of claim 1, wherein said at least some other service equipments in said core network belong to a parent network of the at least one of a called terminal and a calling terminal involved in said given communication.

3. The device of claim 1, wherein said control unit is configured to delete said decision information data contained in a signaling message coming from outside said core network, when the service equipment the control unit is integrated into is located on a border of said core network.

4. The device of claim 1, wherein said control unit is configured, when the control unit is integrated into a service equipment that includes first and second user agents adapted for managing and coordinating multiple session initiation protocol (SIP) dialogs corresponding to a single communication, and when said first user agent receives a signaling message containing said decision information data, to order the second user agent to report this decision information data into the SIP signaling that the second user agent generates.

5. The device of claim 1, wherein said control unit is configured to integrate said decision information data into a dedicated header of said signaling message.

6. The device of claim 1, wherein said control unit is configured to integrate said decision information data into a field of a header of said signaling message.

7. The device of claim 6, wherein in the presence of a session initiation protocol (SIP)type communication-establishing protocol that manages transmission of signaling messages, said field is a record-route field.

8. The device of claim 1, wherein said control unit is configured to integrate complementary information data in at least some of said signaling messages containing said decision information data.

9. The device of claim 8, wherein said control unit is configured to integrate complementary information data representative of an identifier for at least one of a service equipment in which said device is installed and a service type of the at least one communication service.

10. The device of claim 9, wherein said service type is billing for the at least one communications service.

11. Service equipment for an internet communication core network, said equipment being adapted for implementing functions related to providing at least one communication service to at least one communication terminal, the service equipment comprising:
    a control device adapted for implementing, within an Internet communication core network, functions related to providing said at least one communication service to at least one communication terminal, the control device including
    a control unit configured to decide, when a request to provide said at least one communication service for a given communication is received, to implement at least one function chosen from among said functions, then to insert in at least one of a plurality of signaling messages that said service equipment is sending for said given communication, decision information data signaling this decision intended for at least some other service equipments in said core network, in order to prohibit said at least some other service equipments from implementing the chosen function for the duration of the given communication wherein said chosen function is dedicated to on-line charging of at least one of a called terminal and a calling terminal.

12. The service equipment of claim 11, wherein the service equipment forms a session initiation protocol (SIP) type communication-establishing protocol entity, chosen from a group comprising at least a proxy server, an application server, and a media resources function (MRF) type entity.

13. A method of using a control device and service equipment in an Internet communication core network chosen from a group comprising internet protocol multimedia subsystem (IMS) and multimedia domain (MMD), the method comprising:
    deciding, when a request to provide a service for a given communication is received, to implement at least one function chosen from among a plurality functions, using the control device to; and
    inserting in at least one of a plurality of signaling messages that said service equipment is sending for said given communication, information data signaling this decision intended for at least some other service equipments in said core network, in order to prohibit said at least some other service equipments from implementing the chosen function for the duration of the given communication, using the control device, wherein said chosen function is dedicated to on-line charging of at least one of a called terminal and a calling terminal.

* * * * *